(12) United States Patent
Ballester et al.

(10) Patent No.: US 8,316,441 B2
(45) Date of Patent: Nov. 20, 2012

(54) SYSTEM FOR PROTECTING INFORMATION

(75) Inventors: Patrick J. Ballester, Candor, NY (US);
David R. Menigoz, Vestal, NY (US);
Steven J. Pratt, Endicott, NY (US);
Walter S. Richter, Newark Valley, NY (US); Max Smirnoff, Endicott, NY (US); James W. Tripp, Apalachin, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1159 days.

(21) Appl. No.: 11/985,186

(22) Filed: Nov. 14, 2007

(65) Prior Publication Data
US 2009/0126025 A1    May 14, 2009

(51) Int. Cl.
*G06F 21/00* (2006.01)

(52) U.S. Cl. .............. 726/22; 726/27; 713/164

(58) Field of Classification Search .......... 726/1, 22–27, 726/30
See application file for complete search history.

(56) References Cited

U.S. PATENT DOCUMENTS

| 4,442,484 | A | 4/1984 | Childs, Jr. et al. |
| 5,915,086 | A | 6/1999 | Buzsaki et al. |
| 5,960,170 | A * | 9/1999 | Chen et al. ................. 714/38.14 |
| 6,393,516 | B2 | 5/2002 | Johnson |
| 6,499,110 | B1 | 12/2002 | Moses et al. |
| 6,591,355 | B2 | 7/2003 | Schuster et al. |
| 6,601,148 | B2 | 7/2003 | Beukema et al. |
| 6,904,540 | B2 | 6/2005 | McClellan et al. |
| 6,965,593 | B2 * | 11/2005 | Donahue et al. .............. 370/352 |
| 7,089,581 | B1 | 8/2006 | Nagai et al. |
| 2003/0223614 | A1 * | 12/2003 | Robins et al. ................. 382/100 |
| 2004/0044692 | A1 | 3/2004 | Jameson ....................... 707/200 |
| 2005/0010731 | A1 * | 1/2005 | Zalewski et al. .............. 711/162 |
| 2006/0005245 | A1 * | 1/2006 | Durham et al. ................. 726/25 |
| 2006/0253903 | A1 * | 11/2006 | Krumel ........................... 726/13 |
| 2007/0271613 | A1 * | 11/2007 | Joyce .............................. 726/23 |
| 2008/0163372 | A1 * | 7/2008 | Wang ............................. 726/24 |
| 2008/0210746 | A1 * | 9/2008 | Homewood et al. ........... 235/56 |
| 2009/0094468 | A1 * | 4/2009 | Larson .......................... 713/310 |

FOREIGN PATENT DOCUMENTS

CN    1760863    4/2006

OTHER PUBLICATIONS

U.S. Publication No. US 2005/0066165 A1; published Mar. 24, 2005.
U.S. Publication No. US 2005/0120187 A1; published Jun. 2, 2005.
U.S. Publication No. US 2005/0177741 A1; published Aug. 11, 2005.
U.S. Publication No. US 2006/0004820 A1; published Jan. 5, 2006.
U.S. Publication No. US 2006/0048224 A1; published Mar. 2, 20065.
U.S. Publication No. US 2006/0107306 A1; published May 18, 2006.
U.S. Publication No. US 2006/0143685 A1; published Jun. 29, 2006.

(Continued)

*Primary Examiner* — Gilberto Barron, Jr.
*Assistant Examiner* — Malcolm Cribbs
(74) *Attorney, Agent, or Firm* — Tarolli, Sundheim, Covell & Tummino LLP

(57) ABSTRACT

A system in accordance with the present invention protects information. The system includes a processor for processing information and a state machine utilizing tables for determining protection requirements for the information.

20 Claims, 3 Drawing Sheets

OTHER PUBLICATIONS

U.S. Publication No. US 2006/0150238 A1; published Jul. 6, 2006.
U.S. Publication No. US 2006/0156191 A1; published Jul. 13, 2006.
U.S. Publication No. US 2006/0236363 A1; published Oct. 19, 2006.
U.S. Publication No. US 2006/0236368 A1; published Oct. 19, 2006.
"Policy-Driven Memory Protection for Reconfigurable Hardware"; Ted Huffmire, Shreyas Prasad, Tim Sherwood & Rayn Kasterner. Abstract of CN176086.

* cited by examiner

SYSTEM FOR PROTECTING INFORMATION

FIELD OF INVENTION

The present invention relates to a system for processing information, and more specifically, to a system for protecting the information.

BACKGROUND OF THE INVENTION

Conventional information protection techniques focus on hardware-specific methods, e.g., volume protection or physical interface removal, and software-specific methods, e.g., guards and software handshake authentication. A method that integrates both hardware and software to provide a scalable solution would be desirable.

SUMMARY OF THE INVENTION

A system in accordance with the present invention protects information. The system includes a processor for processing information and a state machine utilizing tables for determining protection requirements for the information.

A method in accordance with the present invention protects information. The method comprises the steps of: processing information; utilizing tables for protecting the information; and utilizing the tables to determine protection requirements for the information.

A computer program product in accordance with the present invention protects information. The computer program product comprises: a first process for processing information; a second process for utilizing tables for protecting the information; a third process for utilizing the tables to determine protection requirements for the information; and a fourth process for acting in response to unauthorized activity.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF AN EXAMPLE EMBODIMENT

Figure 1:
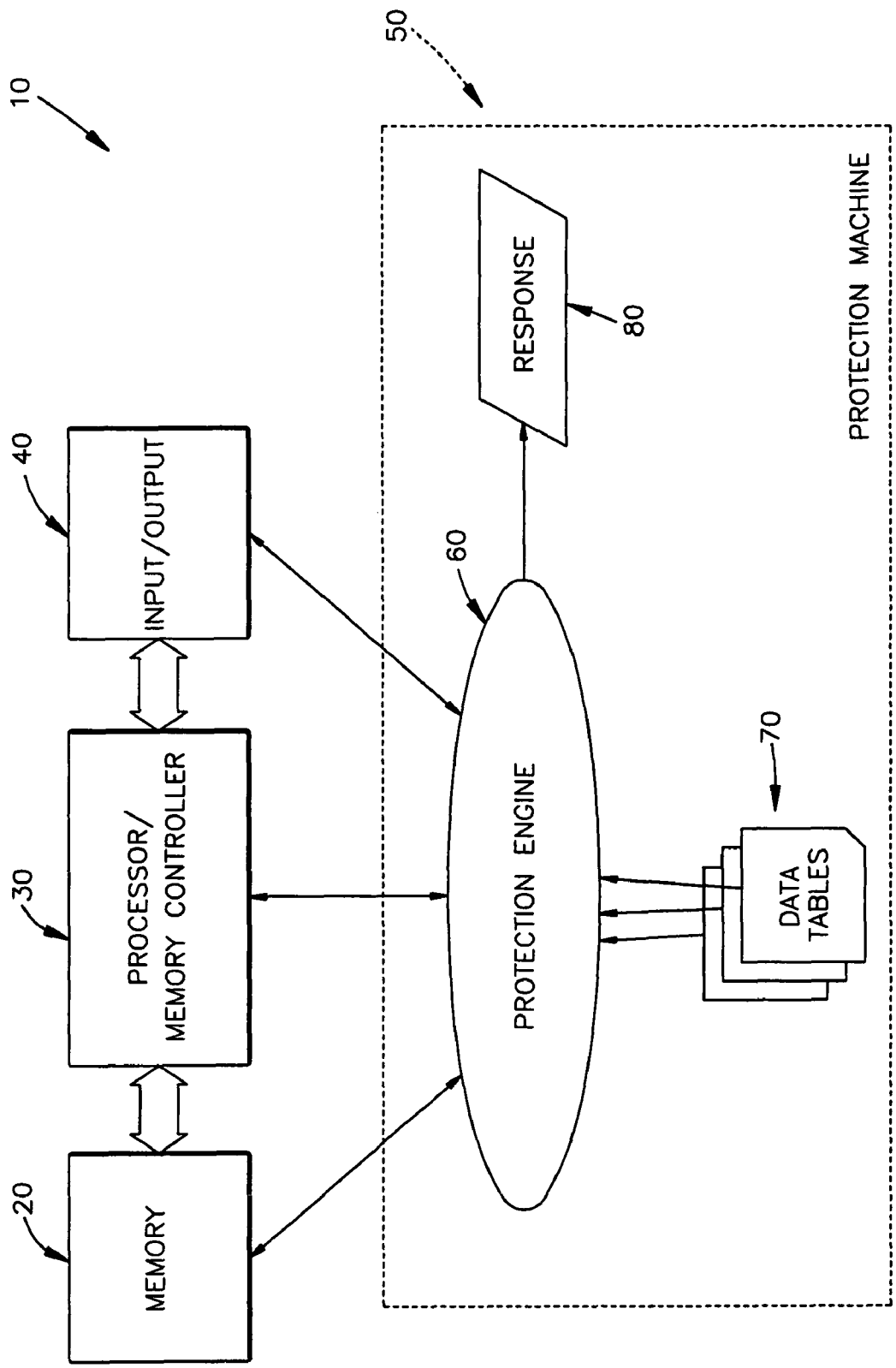
FIG. 1 is an example schematic physical representation of a system in accordance with the present invention.

A system in accordance with the present invention includes a table-driven protection, or anti-tamper, mechanism that is scalable to support multiple program development phases. The system may further include a simple state machine in a field programmable gate array (FPGA) or an application specific integrated circuit (ASIC), which utilizes tables stored in memory to determine platform-specific information protection requirements. The system may thereby perform reads and writes from/to different memory addresses, or any address accessible by the simple state machine, to both guarantee integrity of data contained at the address, as well as take action if the presence of any unauthorized activity is detected. Some examples of implementation of the system are watermarks defined in a table to allow hardware to monitor any alteration of known location(s) in memory, periodic interface handshaking with a software application, and/or interface configuration validation. Since the tables are programmable, the system may provide updates between various platforms with varying levels of desired protection.

The system prevents unauthorized access or usage and supports protection of software. The system further provides an integrated approach, which may be seamlessly tailored for individual platforms with varying levels of information protection. The protection levels may be scalable, thus allowing the varying level of protection.

The system may utilize an engine, e.g. FPGA, ASIC, and/or other processing engine, to read entries from tables stored in the system's memory to determine what locations to utilize in a protection scheme. The engine may utilize data provided in the tables to perform read/write operations, determine data to compare, and what actions to take if the data is not as expected. The tables may also be hard-coded in the engine and/or a mix of memory and hard-coded entries.

Different tables may be used at different processing periods to provide varying levels of verification or protection. For example, the system may utilize a configuration verification table during an initial, power-up sequence to insure full integrity of the environment prior to beginning application processing. A separate table may then be utilized during application processing to monitor external interfaces or interact with the application itself.

The memory in which the tables reside may be obfuscated, encrypted, and/or protected by some other suitable means. The engine may also be protected by suitable volume protection technique(s). The system thus defines a layered approach, which supports detection of unintended usage, while providing variability of responses to detected activities, and traceability for further evaluation.

Another goal of information protection techniques is the ability to utilize the hardware/software in a lab environment. Conventional techniques require an operator to avoid certain functions or operations to avoid an unintended response from the unit under test (UUT). The system provides the capability to alter the response tables to easily support a lab environment for testing purposes.

As discussed above, the system provides a method for protecting software by utilizing a table driven engine to prohibit, monitor, and/or react to undesired activity. In the example embodiment, a simple engine is developed which may parse multiple programmable tables. Each table may contain multiple entries that allow data to be written to and/or read from processor address space.

During a read operation, the expected data may be masked and compared to pre-programmed expected data. If the comparison is not valid, the system may act as indicated by contents of an "action field". Multiple programmable actions may be triggered by a "miscompare" of data by programming the multiple bits in the action field. Each field in a table may be executed until a "termination" action has been encountered or until the table is exhausted.

The tables may be sequenced during various operational periods of the environment to afford protection commensurate with processor operation, such as SystemBoot, Program Load, unsecured operation, transition to secured operation, and secured operation. The system thus provides a capability to interact with the application thereby providing additional protection support.

The table entries provide the information required to perform the protection of the software to be protected. The system may define, at a minimum, identification, control, address, mask, data, and actions.

The identification field may be used as a means of determining what event was detected. This identification value may be stored when the engine has detected an intrusion event or anomaly. This may be any identifier that the end user desires to help isolate the event detected.

The control field may be used to provide any number of controls, e.g. whether the entry indicates a write to an address or a read from an address, to look for a data match or miscompare, to indicate a delay prior to performing the function, etc.

The address field specifies the memory location to be utilized for the current entry processing. For a read operation, the address specifies the location to be read and validated against the control field conditions identified. For a write operation, the address field identifies the location to be written with the data field contents, as described below.

On a read table entry, the mask field may be used to identify the relevant bits in the comparison. The system thus allows the user to ignore bits which may not be relevant to the entry. For example, if the intent of the entry is to validate relevant bits in a status or control register, this feature allows a user to ignore the not applicable bits in the register. For a write operation, the mask field may not be used.

On a read entry, the data field provides the expected data for comparison. When a write is indicated in the control field, the data field provides the contents to be written to the address field indicated.

The action entry field provides a means to selectively indicate, from the actions available, what action(s) to take upon a given entry failure. This field provides the user with the ability to vary the actions in support of different program phases. For example, an action taken on a table entry in a software development phase may be such that the event is merely logged; whereas, once deployed, the action may be more aggressive.

A user may generate multiple tables for different phases of a program, as well as different periods of operation. The system thereby provides total flexibility to the user while providing the protection required. The same programmable action table structure may be used for hardware, software, or firmware detected events, equally well. A hardware signal, such as from a sensor, may be used to trigger an appropriate action as indicated by the table associated with that signal. Similarly, firmware may be used to detect and trigger an action table as a result of firmware monitoring interfaces and/or address spaces.

The system, as herein described, may provide a configurable, combined hardware/software protection architecture, tightly integrated with platform specific data tables, which provides background detection/reaction protection from intrusive or unplanned system tamper attempts. Conventional methods provide a list of either software or hardware centric options. The system may provide a simplistic technique to support an integrated approach which may be seamlessly changed for individual platforms thereby providing varying levels of information protection. The protection levels are also scalable to allow a similar capability to varying levels of the platform architecture.

By developing a simple state machine in an FPGA, or ASIC, or other processing engine that uses tables stored in memory to determine platform specific information protection requirements, which may read and write from/to different memory locations to both guarantee the integrity of data contained in the memory, as well as providing additional integrated software/hardware handshaking and detection of the presence of any unintentional activity on the platform. The system may thereby take a pre-defined course of action.

As shown in FIG. 1, an example system 10 may include a memory 20, a processor 30 for controlling the memory, and an input/output interface 40 (which may be main processing elements of a processor card as one example). The system 10 may further include a protection machine 50 with a protection engine 60, data table(s) 70, and a set of possible responses 80 that the protection machine may execute.

The protection engine 60 may utilize the data table(s) 70 to perform reads/writes for the memory 20, the processor 30, and the input/output interface 40. The protection engine 60 also initiate responses 80 based on an outcome of the reads/writes. The data table(s) 70 may be utilized by the protection engine 60 to determine operations to execute and responses based on an outcome of those operations. Unauthorized attempts to access the memory 20 may thereby be countered.

Figure 2:
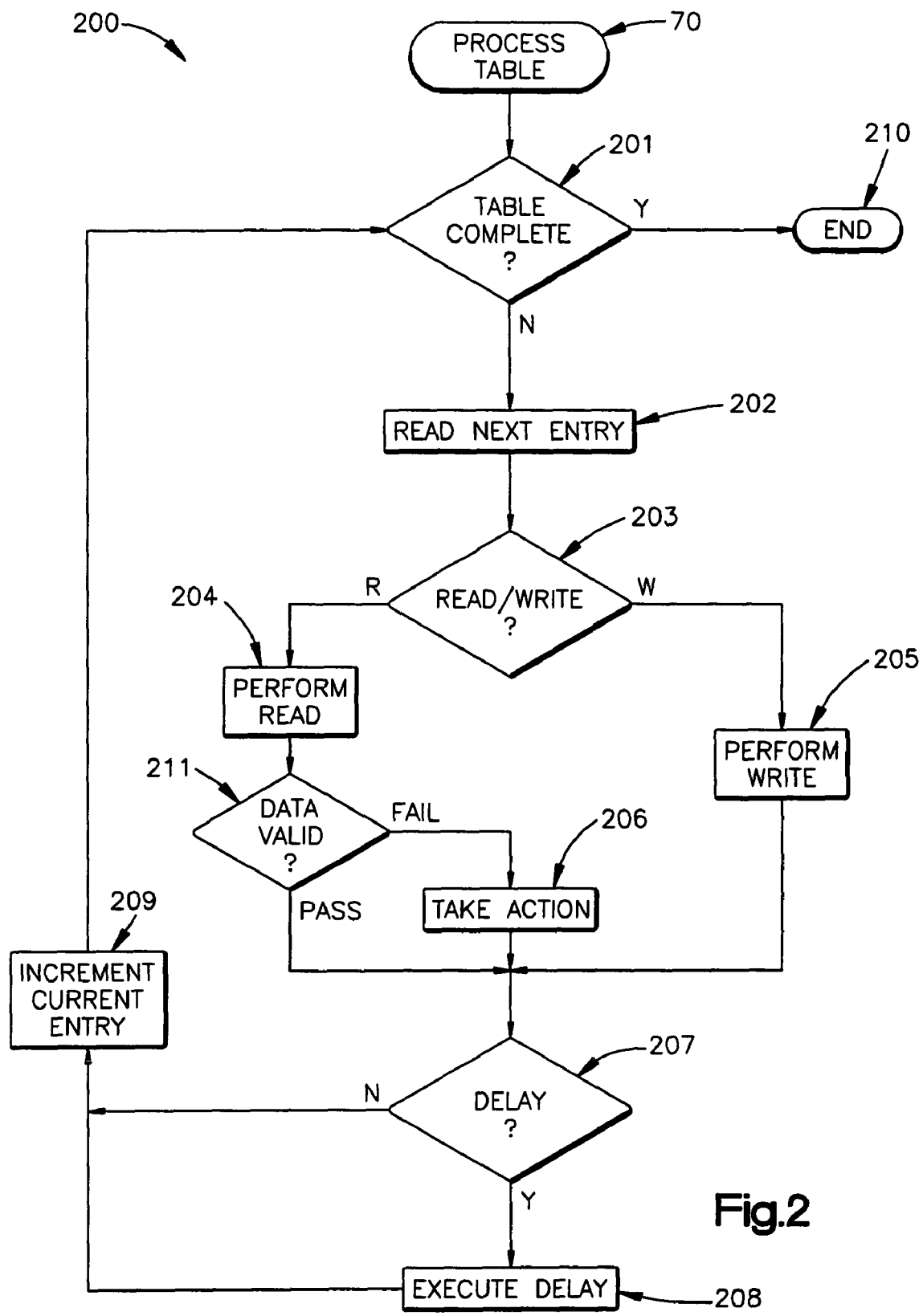
FIG. 2 is an example schematic functional representation of a system in accordance with the present invention.

FIG. 2 represents an example implementation 200 of the system 10. In step 201, the system 10 parses the data table(s) 70 until the table(s) are exhausted. If the table(s) 70 are complete, the system 10 ends its operation at step 210. If the table(s) 70 are not complete, the system 10 reads the next table in step 202. In step 203, the protection engine 60 of the system 10 determines what function to perform from the table 70 being processed (i.e., read, write, etc.) If a read function is determined, in step 204, the system 10 executes a read and the protection engine 60 determines success or failure based on control fields matched with the table 70 being processed (i.e., is the data equal or unequal to an expected value?).

From step 204, the system 10 performs the read and proceeds to step 211. In step 211 the data from step 204 is processed and compared to the expected value. If the comparison passes, the system 10 proceeds to step 207. If the comparison fails, the system 10 proceeds to step 206. In step 206, the protection engine 60 of the system 10 executes an action or response as determined by the table 70 being processed. From step 206, the system 10 proceeds to step 207.

If a write function is determined, in step 205, the system 10 executes a write directly and continues to step 207. In step 207, the protection engine 60 of the system 10 determines whether to delay prior to continuing to the next table 70. If a delay is determined, the system 10 executes a delay in step 208 based on settings of the table 70 being processed. If a delay is not indicated, in step 209, the system 10 indexes, or fetches, the next table entry 70 to be processed.

As shown in FIG. 1, an example system 10 in accordance with the present invention protects information. The system 10 may include a processor 30 for processing information and a state machine 50 utilizing tables 70 for determining protection requirements for the information.

As shown in FIG. 2, an example method 200 in accordance with the present invention protects information. The method comprises the steps of: processing 201 information; utilizing 202-205 tables for protecting the information; and utilizing 206 the tables to determine protection requirements for the information.

Figure 3:
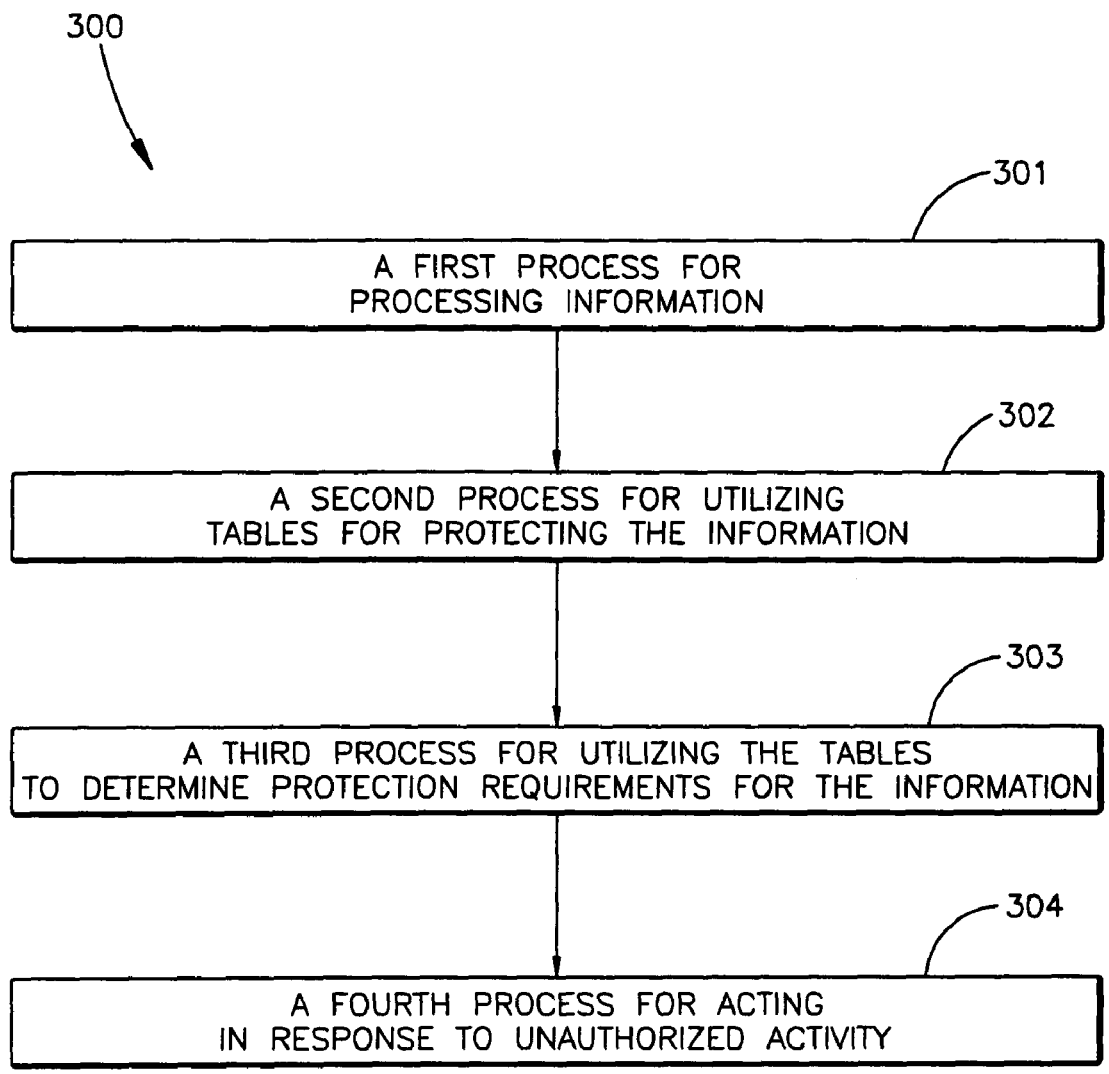
FIG. 3 is a schematic representation of an example computer program product in accordance with the present invention.

As shown in FIG. 3, an example computer program product 300 in accordance with the present invention protects information. The computer program product 300 comprises: a first process 301 for processing information; a second process 302 for utilizing tables for protecting the information; a third process 303 for utilizing the tables to determine protection requirements for the information; and a fourth process 304 for acting in response to unauthorized activity.

In order to provide a context for the various aspects of the present invention, the following discussion is intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications argument model. However, some, if not all aspects of the invention can be practiced on stand-alone computers. In a distributed computing environment, program modules may be located in both local and remote memory storage devices.

An exemplary system for implementing the various aspects of the invention includes a conventional server computer, including a processing unit, a system memory, and a system bus that couples various system components including the system memory to the processing unit. The processing unit may be any of various commercially available processors. Dual microprocessors and other multi-processor architectures also can be used as the processing unit. The system bus may be any of several types of bus structure including a memory bus or memory controller, a peripheral bus, and a local bus using any of a variety of conventional bus architectures. The system memory includes read only memory (ROM) and random access memory (RAM). A basic input/output system (BIOS), containing the basic routines that help to transfer information between elements within the server computer, such as during start-up, is stored in ROM.

The server computer further includes a hard disk drive, a magnetic disk drive, e.g., to read from or write to a removable disk, and an optical disk drive, e.g., for reading a CD-ROM disk or to read from or write to other optical media. The hard disk drive, magnetic disk drive, and optical disk drive are connected to the system bus by a hard disk drive interface, a magnetic disk drive interface, and an optical drive interface, respectively. The drives and their associated computer-readable media provide nonvolatile storage of data, data structures, computer-executable instructions, etc., for the server computer. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM, including an operating system, one or more application programs, other program modules, and program data. A user may enter commands and information into the server computer through a keyboard and a pointing device, such as a mouse. Other input devices (not shown) may include a microphone, a joystick, a game pad, a satellite dish, a scanner, or the like. These and other input devices are often connected to the processing unit through a serial port interface that is coupled to the system bus, but may be connected by other interfaces, such as a parallel port, a game port or a universal serial bus (USB). A monitor or other type of display device is also connected to the system bus via an interface, such as a video adapter. In addition to the monitor, computers typically include other peripheral output devices (not shown), such as speaker and printers.

The server computer may operate in a networked environment using logical connections to one or more remote computers, such as a remote client computer. The remote computer may be a workstation, a server computer, a router, a peer device or other common network node, and typically includes many or all of the elements described relative to the server computer. The logical connections include a local area network (LAN) and a wide area network (WAN). Such networking environments are commonplace in offices, enterprise-wide computer networks, intranets and the internet.

When used in a LAN networking environment, the server computer is connected to the local network through a network interface or adapter. When used in a WAN networking environment, the server computer typically includes a modem, or is connected to a communications server on the LAN, or has other means for establishing communications over the wide area network, such as the internet. The modem, which may be internal or external, is connected to the system bus via the serial port interface. In a networked environment, program modules depicted relative to the server computer, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer, unless otherwise indicated. Such acts and operations are sometimes referred to as being computer-executed. It will be appreciated that the acts and symbolically represented operations include the manipulation by the processing unit of electrical signals representing data bits which causes a resulting transformation or reduction of the electrical signal representation, and the maintenance of data bits at memory locations in the memory system (including the system memory, hard drive, floppy disks, and CD-ROM) to thereby reconfigure or otherwise alter the computer system's operation, as well as other processing of signals. The memory locations where such data bits are maintained are physical locations that have particular electrical, magnetic, or optical properties corresponding to the data bits.

It will be understood that the above description of the present invention is susceptible to various modifications, changes and adaptations, and the same are intended to be comprehended within the meaning and range of equivalents of the appended claims. For example, the claim term "system" may comprise all methods, apparatuses, processes, devices, computer program products, algorithms, and any other parts of the aforesaid system that are part of the operational characteristics of the invention described herein. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim:

1. A system for protecting a plurality of software platforms, said system comprising:
   a processor for processing information;
   a state machine utilizing a plurality of tables for determining protection requirements for the plurality of software platforms, the plurality of tables comprising a first table storing a first set of protection requirements for a first software platform and a second table storing a second set of protection requirements for a second software platform, the first set of protection requirements being different from the second set of protection requirement, said plurality of tables including memory-monitoring, allowing hardware to detect an alteration of a location of one of the plurality of software platforms in a memory of said processor.

2. The system as set forth in claim 1 wherein said tables include a first field that defines unauthorized activities and a second field that defines appropriate actions for said processor if said tables indicate unauthorized activity is detected.

3. The system as set forth in claim 1 wherein said processor implements a periodic handshaking with a software application.

4. The system as set forth in claim 1 wherein said tables allow said processor to validate an interface configuration of said system.

5. The system as set forth in claim 1 wherein said state machine includes a field programmable gate array for determining the protection requirements.

6. The system as set forth in claim 1 wherein said state machine includes an application specific integrated circuit for determining the protection requirements.

7. The system as set forth in claim 1 wherein said state machine, during an initial power-up sequence for the system, utilizes a third table, storing a third set of protection requirements, for the first software platform and a fourth table, storing a fourth set of protection requirements, for the second software platform, the first set of protection requirements being different from the third set of protection requirement and the second set of protection requirements being different from the fourth set of protection requirement and to provide varying levels of protection for the first and second software platforms.

8. The system as set forth in claim 1 wherein said tables are adjustable for supporting testing in a laboratory environment.

9. The system as set forth in claim 1 wherein said state machine sequences said tables for providing protection of the information during various operations of said processor.

10. A method for protecting a plurality of software platforms, said method comprising the steps of:
    processing information relating to the plurality of software platforms;
    implementing periodic handshaking with a software application;
    utilizing a plurality of tables for protecting the plurality of software platforms, the plurality of tables comprising a first table storing a first set of protection requirements for a first software platform and a second table storing a second set of protection requirements for a second software platform, the first set of protection requirements being different from the second set of protection requirement; and
    utilizing the plurality of tables to determine protection requirements for the plurality of software platforms.

11. The method as set forth in claim 10 further including the steps of guaranteeing integrity of the plurality of software platforms and acting in response to unauthorized activity.

12. The method as set forth in claim 10 further including the step of utilizing a watermark to detect an alteration of a location of the plurality of software platforms.

13. The method as set forth in claim 10 further including the steps of validating an interface configuration.

14. A system for protecting a plurality of software platforms, said system comprising:
    a processor for processing information, said processor implementing a periodic handshaking with a software application;
    a state machine utilizing a plurality of tables for determining protection requirements for the plurality of software platforms, the plurality of tables comprising a first table storing a first set of protection requirements for a first software platform and a second table storing a second set of protection requirements for a second software platform, the first set of protection requirements being different from the second set of protection requirement.

15. The system as set forth in claim 14 wherein said tables include a first field that defines unauthorized activities and a second field that defines appropriate actions for said processor if said tables indicate unauthorized activity is detected.

16. The system as set forth in claim 14 wherein said tables include memory-monitoring, allowing hardware to detect an alteration of a location of one of the plurality of software platforms in a memory of said processor.

17. The system as set forth in claim 14 wherein said tables allow said processor to validate an interface configuration of said system.

18. The system as set forth in claim 14 wherein said state machine includes a field programmable gate array for determining the protection requirements.

19. The system as set forth in claim 14 wherein said state machine includes an application specific integrated circuit for determining the protection requirements.

20. The system as set forth in claim 14 wherein said state machine, during an initial power-up sequence for the system, utilizes a third table, storing a third set of protection requirements, for the first software platform and a fourth table, storing a fourth set of protection requirements, for the second software platform, the first set of protection requirements being different from the third set of protection requirement and the second set of protection requirements being different from the fourth set of protection requirement and to provide varying levels of protection for the first and second software platforms.

* * * * *